June 20, 1967  B. V. MOLSTEDT ET AL  3,327,040
ELECTRODE INSTALLATION
Original Filed Aug. 7, 1963
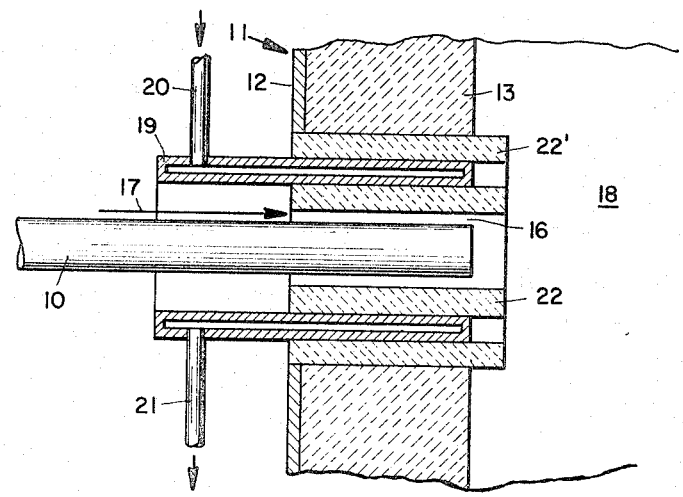
R. O MAAK
B. V. MOLSTEDT   INVENTORS
L. J. DELAUNE
BY Llewellyn C. Proctor
PATENT ATTORNEY

3,327,040
ELECTRODE INSTALLATION

Byron V. Molstedt, Robert O. Maak, and Lawrence J. Delaune, all of Baton Rouge, La., assignors to Esso Research and Engineering Company, a corporation of Delaware Original application Aug. 7, 1963, Ser. No. 300,493. Divided and this application July 18, 1966, Ser. No. 566,031

5 Claims. (Cl. 13—20)

This is a division of application Ser. No. 300,493 filed Aug. 7, 1963.

The present invention is concerned with an improved electrode installation for electrically heated beds. More specifically, it concerns an improved electrode installation for an electrically heated fluid bed used in gasifying hydrocarbons to coke and hydrogen. In particular, it deals with the elimination of the short-circuiting of the electrodes and the surrounding insulating walls in electrically heated gasification reactors which ultimately results in insulation failure.

Numerous methods for converting petroleum fractions into light gasiform products, e.g., hydrogen, have been advanced in the art. While, for example, the conversion of methane or refinery tail gas to hydrogen and coke is a well-known chemical reaction, the elevated temperatures required for desirable yields result in relatively high costs for supplying requisite thermal energy. Thus, numerous processes which might have been theoretically sound are impractical when analyzed from a commercial viewpoint.

Recent advances in this art have shown that in areas where the cost of electricity is relatively cheap, e.g., 6–8 mills/kwh., this reaction can be run economically by employing electrically heated, dense fluidized beds of solids maintained at the reaction temperature. The solids are heated by a controlled electrical potential or voltage applied across one or more portions of the solids bed, the resistance of the solids to electrical flow resulting in their being heated to the desired temperatures. The magnitude of the electrical potential or voltage is normally within the range of 0.1 to 1000 volts/inch, preferably, 3–20 volts/inch, and is controlled to cause resistance heating of the solids without resulting in electrical spark discharges within the solids mass. The electrical power is supplied through a plurality of electrodes immersed into the side of a dense phase of the fluidized coke. The electro-fluid reactor operates in the general temperature range of 1900–2800° F. and in the pressure range of 5 to 500 p.s.i.g. Hydrocarbon feed is injected into the dense bed during the operation of the reactor and is converted quantitatively to coke and hydrogen gas after a residence time of from about 0.2 to about 30 seconds. The solids in the fluid bed are preferably fluid coke particles from a fluid coking process or coke produced in the present process.

However, these electrically heated fluidized bed reactors, while representing a great improvement over the previous methods used in the art, still are the source of serious operational problems. The principal difficulty which has beset operation of electrically heated fluidized beds at elevated temperatures has been electrical failure. This has ensued as the result of apparent breakdown, within or in the vicinity of the fluidized bed, of the electrical insulating properties of the structural elements separating electrodes which are operating at different potentials. Such breakdowns are caused by short circuits and have been known to melt even ceramic structural elements used to retain the electrodes and fluidized bed.

Short circuits arise when conducting material, such as coke, from the fluid bed is deposited near the electrode area on or within the insulating refractory material which makes up the wall of the reactor. This allows increased current to flow through the insulating material. As this current increases, it causes the temperature of the wall to increase since it is at a high original resistance level. In turn, as the temperature rises, the electrical resistance of the insulating walls will decrease (the electrical resistance of materials is inversely proportional to their temperature). Thus more current will pass at the lower resistance, further increasing the temperature. The result is a rapidly accelerating temperature rise which will end only when the heat removed from the insulating material balances that which is being generated electrically or until the material fuses.

It has now been found that failure of insulation materials in the reactor wall due to short circuits from the electrodes can be eliminated. This is accomplished by spacing the electrode a short distance from the insulating wall. A stream of gas is blown through the interstitial area and on into the reactor. This purge gas stream serves to remove heat from the insulating wall, thereby preventing the resistance-temperature cycle from accelerating in uncontrollable fashion. Furthermore, the force of the gas flow serves to keep fluid bed material, especially hydrocarbons, out of the voids or clearances on the surface of the insulating wall, thereby preventing accumulation of electrically conductive matter such as coke therein. The gas may comprise recycle product hydrogen, inert gases (such as nitrogen, helium, argon, etc.), steam, carbon dioxide, oxygen, air, mixtures thereof, or any gas that will not interact undesirably with the reactants or products of the gasification process. It may be desired to use a mixture of gases such as recycle product hydrogen with air or steam. The added air or steam will oxidize any carbon which might have adhered to the surface of the wall or electrode while the hydrogen present will allow high gas pressure to be maintained in the purge stream without using excessive amounts of the active air or steam components. This will minimize undesirable interaction of the purge gas mixture with the fluid bed material being processed.

It has further been found that an electrode installation wherein each electrode is individually shielded by a nonporous, nonconductive refractory material such as fused alumina, beryllia, etc., is less subject to electrical failure even when operating at gasification temperatures. The nonconductive sleeve fits around the electrode between the electrode and the insulating wall and acts as a barrier to electrical short circuits through the insulation liner. Additionally, the nonporous nature of the sleeve avoids the conduction problems which arise when conductive materials deposit on wall surfaces. Use of such sleeves allows a great reduction in the quantity of purge gas needed to prevent electrical failure. The combination of a nonporous, nonconductive sleeve with a gas purge is most desirable since it results in the longest possible electrode life at a minimal equipment and maintenance cost.

Other modifications of the present invention are possible. For instance, it is possible to utilize a nonconductive sleeve which is made of a porous refractory material such as alumina. In this embodiment, the purge gas is introduced through the porous sleeve into the reactor. The flow of the gas will act to prevent deposition of conductive material within the pores and will also serve to cool the sleeve and the neighboring electrode and insulation. On the other hand, a combination of alternating porous and nonporous, nonconductive refractory sleeves may be employed to ensure freedom from electrical failure even under the most stringent of operating conditions.

In order to lessen the amount of purge gas needed, it is also possible to utilize cooling means such as a cooling element or coil to effect the cooling of the insulation and the electrode. The gas, therefore, will be used in this embodiment in an amount sufficient only to prevent deposition. Any suitable fluid known in the cooling art may be used in the coil although water is considered most desirable due to its high specific heat, low cost and noncorrosiveness.

The various aspects of the present invention will be made more clearly apparent by reference to the following description and accompanying drawing.

The figure represents an electrode installation having a gas purge system combined with two nonporous, nonconductive refractory sleeves, which sleeves have a thermally-conducting cooling element interposed between them.

A solid elongated cylindrical electrode 10 is positioned to extend through a horizontal opening in the reactor wall 11. This wall is composed of two sections, the metal shell of the reactor 12 and insulating material 13. In a preferred embodiment, the surface of insulating material 13 which contacts the fluid bed is glazed so as to minimize the deposition of coke and the like particles thereupon. Power for electrode 10 is obtained from a suitable power supply.

Specifically, the figure describes an electrode installation having a gas purge system, two concentric spaced, cylindrical, nonporous, electrically nonconductive sleeves 22, 22′ and a thermally-conducting cooling element 19 interposed in the space between the sleeves. Electrode 10 is surrounded by purge gas space 16. Purge gas is utilized for the twin purposes of cooling the insulating and electrode surfaces and further for the prevention of deposition of foreign material within the area between the insulating wall and the electrode. Nonporous, nonconductive refractory sleeve 22 is concentrically cylindrically positioned about electrode 10 and purge gas space 16. Spaced apart from sleeve 22 but in the same relationship as to electrode 10 and purge gas space 16 is nonporous, nonconductive refractory sleeve 22′. The purge gas serves to cool electrode 10 and sleeve 22. Cooling element 19, which extends towards cavity 18 for a distance equivalent to electrode 10, cools sleeves 22 and 22′. A cooling gas can be passed through the annular passageway within element 19 by inlet means 20 and outlet means 21.

An embodiment of the figure had the following physical characteristics. Space 16 had a distance of 0.031 inch between electrode 10 and nonporous, nonconductive sleeve 22. Cooling element 19 contacting sleeves 22 and 22′ had a coolant circulation rate of 1 g.p.m. A purge gas consisting of hydrogen is passed through space 16 at the rate of 300 s.c.f./hour. Sleeves 22 and 22′ extend into cavity 18 0.75 inch beyond the wall 11.

Summarily, the present invention offers the following advantages over apparatus heretofore known in the art.

(1) Effectively prevents electrical failure due to short circuiting between the electrodes through, or on the surface of, the insulation by means of relatively inexpensive materials.

(2) Deposition of foreign particles in and about the electrode installation is prevented.

(3) Cooling of the electrode and the adjacent insulation wall is accomplished, thereby preventing a resistance-temperature cycle runaway.

While the invention is more particularly adapted for use in electrically heated fluidized beds for gasifying hydrocarbons, it may also be used in electrically heated fixed and moving beds. Reaction processes employing electrically heated beds, such as the preparation of carbon disulfide, hydrogen cyanide, calcium carbide, and further processes, such as desulfurization, calcination, and steel manufacture, are additional areas wherein the present invention may be utilized to good advantage.

What is claimed is:

1. An electrode installation within a high temperature electro-fluid bed reactor comprising in combination
    (a) a reactor wall;
    (b) an opening through the reactor wall;
    (c) an elongated electrode, of diameter less than that of said opening, mounted transversely with its forward end extended through the opening;
    (d) cooling elements, of diameter intermediate that of the electrode and wall opening, circumferentially mounted within the opening and surrounding said electrode, said cooling element including
        an electrically nonconductive refractory sleeve surrounding the electrode, and
        a thermally conductive sleeve provided with an internal passageway circumferentially mounted so that a portion of its external surface is contiguous to and in direct physical contact with at least a portion of the surface of the said refractory sleeve,
        said cooling elements being of sufficient diameter and positioned to provide an annular passageway between the internal surface of said cooling elements and said electrode; and
    (e) gas inlet means adapted to provide purge gas to said annular passageway between said cooling elements and said electrode to effect cooling.

2. The electrode installation of claim 1 wherein the cooling elements include a pair of electrically nonconductive refractory sleeves, one of larger diameter and another of smaller diameter than that of the thermally conductive sleeve, concentrically mounted one on each side of the thermally conductive sleeve.

3. The electrode installation of claim 2 wherein the said refractory sleeves are nonporous.

4. The electrode installation of claim 2 wherein the larger diameter refractory sleeve is mounted within the wall opening contiguous to and against the reactor wall so as to leave no passageway for a purge gas stream between the said wall and said thermally conductive sleeve.

5. The electrode installation of claim 1 wherein the cooling elements include a refractory sleeve which extends beyond the terminal forward end of the electrode, and into the confines of the reactor.

References Cited

UNITED STATES PATENTS

| | | | |
|---|---|---|---|
| 1,542,716 | 6/1925 | Payne | 13—15 |
| 2,405,236 | 8/1946 | Rhoades et al. | 13—17 |
| 2,904,609 | 9/1959 | Schjelderup et al. | 13—17 |
| 2,982,804 | 5/1961 | Reschke | 13—16 |
| 3,118,046 | 1/1964 | Harrington | 219—75 |

RICHARD M. WOOD, *Primary Examiner.*

V. Y. MAYEWSKY, *Assistant Examiner.*